United States Patent
Kamigaito et al.

(10) Patent No.: US 11,009,386 B2
(45) Date of Patent: May 18, 2021

(54) COMBINATION WEIGHING DEVICE AND COMBINATION WEIGHING METHOD WITH REDUCED RESIDUAL WASTE

(71) Applicant: Ishida Co., Ltd., Kyoto (JP)

(72) Inventors: Satoru Kamigaito, Ritto (JP); Hiroe Konishi, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 692 days.

(21) Appl. No.: 15/754,890

(22) PCT Filed: Aug. 24, 2016

(86) PCT No.: PCT/JP2016/074645
§ 371 (c)(1),
(2) Date: Feb. 23, 2018

(87) PCT Pub. No.: WO2017/038576
PCT Pub. Date: Mar. 9, 2017

(65) Prior Publication Data
US 2020/0225077 A1    Jul. 16, 2020

(30) Foreign Application Priority Data
Sep. 2, 2015    (JP) .................... JP2015-173139

(51) Int. Cl.
*G01G 19/393*    (2006.01)
*G01G 19/387*    (2006.01)

(52) U.S. Cl.
CPC ......... *G01G 19/387* (2013.01); *G01G 19/393* (2013.01)

(58) Field of Classification Search
CPC ..................... G01G 19/387; G01G 19/393
See application file for complete search history.

(56) References Cited

U.S. PATENT DOCUMENTS 4,418,771 A * 12/1983 Henry ................. G01G 13/024
177/1
4,446,937 A * 5/1984 Asai ....................... G01G 19/42
177/1

(Continued)

FOREIGN PATENT DOCUMENTS

EP    0 640 814 A1    3/1995
JP    S61-025027 A    2/1986

(Continued)

OTHER PUBLICATIONS

International Search Report issued in PCT/JP2016/074645; dated Sep. 27, 2016.

(Continued)

*Primary Examiner* — Randy W Gibson
(74) *Attorney, Agent, or Firm* — Studebaker & Brackett PC

(57) ABSTRACT

A combination weighing apparatus includes a plurality of hoppers a conveying unit; a weighing unit; a controller; and a setting unit, the controller executing the combination weighing based on a measured value acquired in a cycle in which the combination weighing failed and corresponding to the articles that were forcibly discharged from at least some of the hoppers and measuring values associated with the respective hoppers weighed in a cycle after the cycle in which the combination weighing failed.

12 Claims, 3 Drawing Sheets

(56) References Cited

U.S. PATENT DOCUMENTS

| | | | | | |
|---|---|---|---|---|---|
| 4,534,428 | A | * | 8/1985 | Mosher | G01G 19/393 |
| | | | | | 177/1 |
| 4,642,788 | A | * | 2/1987 | Haze | G01G 19/393 |
| | | | | | 177/25.18 |
| 4,666,002 | A | * | 5/1987 | Haze | G01G 19/393 |
| | | | | | 177/1 |
| 5,753,867 | A | * | 5/1998 | Konishi | G01G 19/393 |
| | | | | | 177/25.18 |
| 5,859,389 | A | * | 1/1999 | Tatsuoka | G01G 19/393 |
| | | | | | 177/17 |
| 2003/0205413 | A1 | | 11/2003 | Gesuita et al. | |

FOREIGN PATENT DOCUMENTS

| | | | |
|---|---|---|---|
| JP | H08-261815 | A | 10/1996 |
| JP | H08-271328 | A | 10/1996 |
| JP | 2004-191082 | A | 7/2004 |
| JP | 2007-003217 | A | 1/2007 |
| JP | 4804810 | B2 | 11/2011 |
| JP | 2012-112758 | A | 6/2012 |

OTHER PUBLICATIONS

The extended European search report issued by the European Patent Office dated Mar. 18, 2019, which corresponds to European Patent Application No. 16841608.9-1001 and is related to U.S. Appl. No. 15/754,890.

International Preliminary Report on Patentability issued in International Application No. PCT/JP2016/074645; dated Mar. 15, 2018.

* cited by examiner

COMBINATION WEIGHING DEVICE AND COMBINATION WEIGHING METHOD WITH REDUCED RESIDUAL WASTE

TECHNICAL FIELD

One aspect of the present invention relates to a combination weighing apparatus and a combination weighing method.

BACKGROUND ART

The combination weighing apparatus has been widely used in a production line of processed foods or the like (hereinafter referred to as articles) as an automatic weighing device that weighs to a certain amount the processed foods or the like that are supplied from an upstream side device and discharges them to a packaging device of the downstream side.

In such a production line, when changing the type of articles in operation or stopping the operation of the device at the time of closing, the operation is stopped in sequence from the upstream side devices and the supply to the combination weighing apparatus of the downstream side is interrupted. However, because a considerable amount of the articles still remains in the combination weighing apparatus, as described in the following Patent Literature, residual material in the device is discharged outside the device in a state that all opening and closing gates of all hoppers are fully opened.

CITATION LIST

Patent Literature

Patent Literature 1: Japanese Unexamined Patent Application Publication No. H8-271328
Patent Literature 2: Japanese Patent No. 4804810

SUMMARY OF INVENTION

Technical Problem

However, the articles discharged outside the device are normally handled as defectives. Accordingly, in users who emphasize the yield rate of products or users who handle articles of high unit price, there is a demand to weigh such residual material to a certain amount as much as possible to make them as goods.

Thus, when the amount of residues in the device becomes small, it is conceivable to sustain the combination weighing as much as possible, by additionally supplying the articles to hoppers lacking the articles or by raising an upper limit of a combination target value. However, in a state that the supply from the upstream is interrupted, the combination weighing is no longer established. Because of this, the present state is that, even if the articles more than the content amount of a single piece of goods remain in the device as a whole, at the time that the combination weighing is no longer established, the remaining articles in the device are discharged in a discharge mode.

An object of one aspect of the present invention is to provide a combination weighing apparatus and a combination weighing method capable of reducing the amount discharged in a discharge mode down to the amount less than the content amount of a single piece of goods.

Solution to Problem

A combination weighing apparatus according to one aspect of the present invention includes a conveying unit that conveys articles; a plurality of hoppers that temporarily stores therein the articles conveyed by the conveying unit; a weighing unit that weighs a measured value corresponding to a mass of the article stored in each of the hoppers; a controller that executes combination weighing that selects a combination of measured values from the plurality of measured values weighed by the weighing unit and associated with the respective hoppers such that a total value of the measured values to be combined becomes a target measurement value, and causes the hoppers associated with the combination to discharge the articles; and a setting unit that sets a closing mode in which combination weighing is executed on the articles remaining in the conveying unit and the hoppers in a state that the supply of the articles to the conveying unit is stopped, wherein the controller executes the combination weighing based on a measured value acquired in a cycle in which the combination weighing failed and corresponding to the articles that were forcibly discharged from at least some of the hoppers and measured values associated with the respective hoppers weighed in a cycle after the cycle in which the combination weighing failed, when the closing mode is set by the setting unit.

According to the above-described combination weighing apparatus, in the closing mode, even when the combination weighing fails with only the measured values of the respective hoppers, after forcibly discharging the articles from some of the hoppers and supplying the articles to the hoppers for which the articles were forcibly discharged in a cycle after the cycle in which the combination weighing failed, the combination weighing is executed again based on the measured values associated with the respective hoppers and a measured value corresponding to the forcibly discharged articles. In such a combination weighing apparatus, the combination weighing is likely to be established. When the combination weighing is not established even so, because the combination weighing is executed based on the articles weighed over a plurality of times by further repeating forced discharge, the amount of articles remaining in the combination weighing apparatus (the articles remaining in the conveying unit and the hoppers) can be reduced to a minimum amount that cannot be made into goods. Accordingly, it is possible to improve the yield rate of the product and to suppress the waste that becomes a defective.

In one embodiment, the setting unit may be capable of setting the number of times of continuation of failure in the combination weighing in the closing mode; the controller may perform the combination weighing after additionally supplying the articles to some of the hoppers each time the combination weighing fails, while the number of times of continuation is below the number of times set by the setting unit; and the controller may execute the combination weighing based on measured values corresponding to the articles that were forcibly discharged from some of the hoppers and measured values associated with the respective hoppers weighed in a cycle after the cycle in which the combination weighing failed, when the number of times of continuation reaches the number of times of continuation set by the setting unit.

According to the above-described combination weighing apparatus, as the hopper of forcibly discharging, the hopper for which the number of times of not having discharged the articles is large is preferentially selected. That is, if the number of times of non-discharge of the articles is large, a large amount of the articles may remain in a pool hopper at the upper stage that supplies the articles to the relevant hopper, and a radial feeder at the further upper stage thereof. In this combination weighing apparatus, because the series in which a large amount of articles remains are preferentially selected, it is possible to effectively reduce the amount of the articles remaining in the combination weighing apparatus (the articles remaining in the conveying unit and the hoppers).

In one embodiment, an upper-limit extension unit that extends an upper limit of the target measurement values may further be provided, and the controller may execute, after extending the upper limit of the target measurement value, the combination weighing based on measured values acquired in a cycle in which the combination weighing failed and corresponding to the articles that were forcibly discharged from at least some of the hoppers and measured values associated with the respective hoppers weighed in a cycle after the cycle in which the combination weighing failed.

According to the above-described combination weighing apparatus, it is possible to facilitate establishing the combination weighing and effectively reduce the amount of the articles remaining in the combination weighing apparatus (the articles remaining in the conveying unit and the hoppers).

A combination weighing method according to one aspect of the present invention is a combination weighing method for executing combination weighing in which, when articles remaining in a combination weighing apparatus are supplied to a plurality of hoppers in a state that new supply of the articles is interrupted, a combination of measured values is selected from a plurality of measured values associated with the respective hoppers such that a total value of the measured values to be combined becomes a target measurement value, and the combination weighing method includes steps of forcibly discharging the articles from at least some of the hoppers and supplying the articles again to the hoppers which forcibly discharged the articles, when the combination weighing fails; and executing the combination weighing based on measured values acquired in a cycle in which the combination weighing failed and corresponding to the articles that were forcibly discharged from at least some of the hoppers and measured values associated with the respective hoppers weighed in a cycle after the cycle in which the combination weighing failed.

The case in which the combination weighing was not established (the case in which the combination weighing failed) means that the combination total value did not fall between an upper limit of the target measurement value and a lower limit of the target measurement value (normally, this lower limit becomes "target measurement value") (hereinafter this range is referred to as "tolerable range"), and it includes the case of excessive amount in which the combination total value exceeds the tolerable range, or the case of a lightweight in which it does not reach the tolerable range. The combination that is within the tolerable range and is the closest to the target measurement value is referred to as an optimal combination. The measured value used here is a concept including the mass of the articles or the number of pieces obtained by dividing its mass by a unit mass.

In one embodiment, a case in which combination weighing failed may include a case in which combination weighing was not established even when the articles were additionally supplied to some of the hoppers.

When the combination weighing failed, the combination weighing is executed again, after additionally supplying the articles to some of the hoppers, not by forcibly discharging the articles from some of the hoppers suddenly. In that case, the combination weighing may be established. Accordingly, even when entered the closing mode, it is possible to effectively reduce the amount of the articles remaining in the combination weighing apparatus while discharging the articles as the articles weighed to a certain amount.

In one embodiment, after forcibly discharging the articles from some of the hoppers, the combination weighing is executed based on, after extending an upper limit of the target measurement values, measured values acquired in a cycle in which the combination weighing failed and corresponding to the articles that were forcibly discharged from at least some of the hoppers and measured values associated with the respective hoppers weighed in a cycle after the cycle in which the combination weighing failed.

According to the above-described combination weighing method, it is possible to facilitate establishing the combination weighing and to effectively reduce the amount of the articles remaining in the combination weighing apparatus (the articles remaining in the conveying unit and the hoppers).

Advantageous Effects of Invention

According to one aspect of the present invention, it is possible to reduce the amount discharged by the discharge mode down to the amount less than the content amount of a single piece of goods.

DESCRIPTION OF EMBODIMENT

With reference to the accompanying drawings, the following describes a combination weighing apparatus according to one exemplary embodiment. The following embodiment, however, is not intended to limit the technical scope of the present invention.

Figure 1:
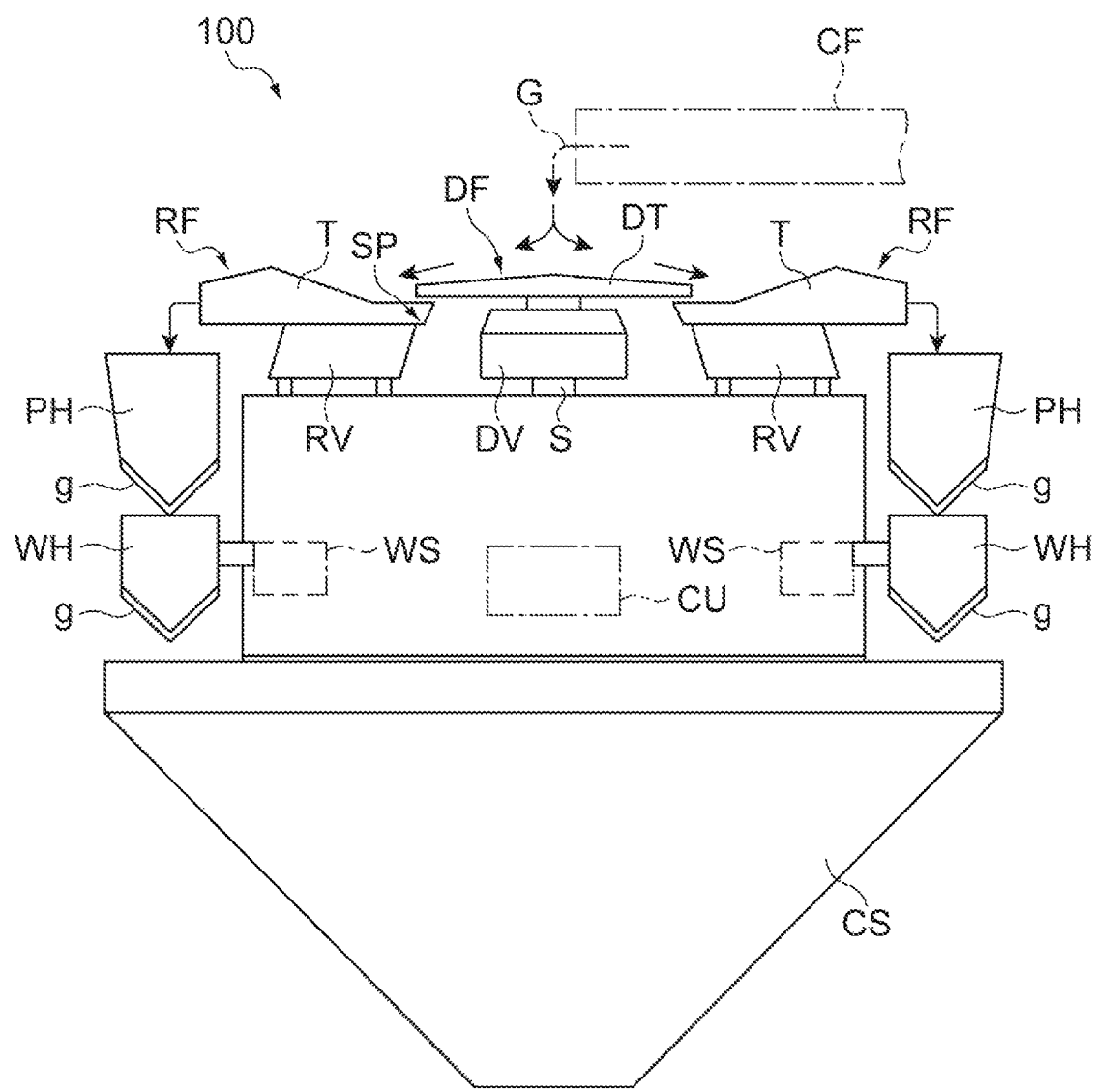
FIG. 1 is a schematic configuration diagram of a combination weighing apparatus according to one embodiment.

FIG. 1 is a schematic diagram of a principal portion of the combination weighing apparatus in the one embodiment. In FIG. 1, a combination weighing apparatus 100 includes a distributing feeder (conveying unit) DF arranged at a central upper portion of the device, a plurality of radial feeders (conveying units) RF radially arrayed so as to surround the distributing feeder DF, a plurality of pool hoppers PH arrayed at a lower stage of the respective radial feeders RF, the same number of weighing hoppers (hoppers) WH arrayed at a lower stage of the pool hoppers PH, and a collection chute CS arranged below the weighing hoppers WH.

The distributing feeder DF radially diffuses articles G supplied onto the dispersion table DT, as a dispersion table DT of a cone shape vibrates that is fitted to a movable portion of an electromagnetic feeder DV. On the distributing feeder DF, a mass sensor S is mounted. The mass of the articles G supplied onto the dispersion table DT is detected by the mass sensor S, and its detected mass is input to a controller CU which will be described later. Above the distributing feeder DF, a cross feeder CF is provided. The cross feeder CF is, based on the detected mass of the mass sensor S, controlled to on or off. Accordingly, the articles G of a certain amount are to be stored on the dispersion table DT at all times.

The radial feeder RF, as a trough T mounted on a movable portion of an electromagnetic feeder RV vibrates back and forth and diagonally, conveys the articles G on the trough T forward and discharges the articles G to the pool hopper PH at the lower stage from its distal end portion. Thus, a starting end portion SP that conveys the articles G on the trough T is hidden underneath the dispersion table DT of the distributing feeder DF so as not to leak out the articles G from the trough T. The troughs T of the respective radial feeders RF are radially arrayed adjacent to one another. One of the sidewalls of the adjacent trough T overlaps the sidewall of the other trough T. Because a whole of the radially arrayed troughs T serves as one receiving tray so as to store the articles G with the entire troughs T, the articles G do not leak out from between the adjacent troughs T.

The pool hopper PH temporarily stores therein the articles G discharged from the radial feeder RF. When a gate g of the weighing hopper WH at the lower stage opens and closes and the weighing hopper WH becomes empty, the controller CU which will be described later opens and closes a gate g of the pool hopper PH. Accordingly, the articles G stored in the pool hopper PH are supplied to the weighing hopper WH. The weighing hopper WH is supported by a mass sensor (weighing unit) WS. That is, because an entire load of the weighing hopper WH is loaded on the mass sensor WS, by substracting a tare mass of the hopper itself from a total mass detected by the mass sensor WS, the mass of the supplied articles G is obtained. The obtained mass of the articles G is input to the controller CU and used for combination calculation. Because the pool hopper PH and the weighing hopper WH are of known configurations, the description of a gate-opening and closing mechanism, a supporting mechanism, and the like in the pool hopper PH and the weighing hopper WH is omitted.

Figure 2:
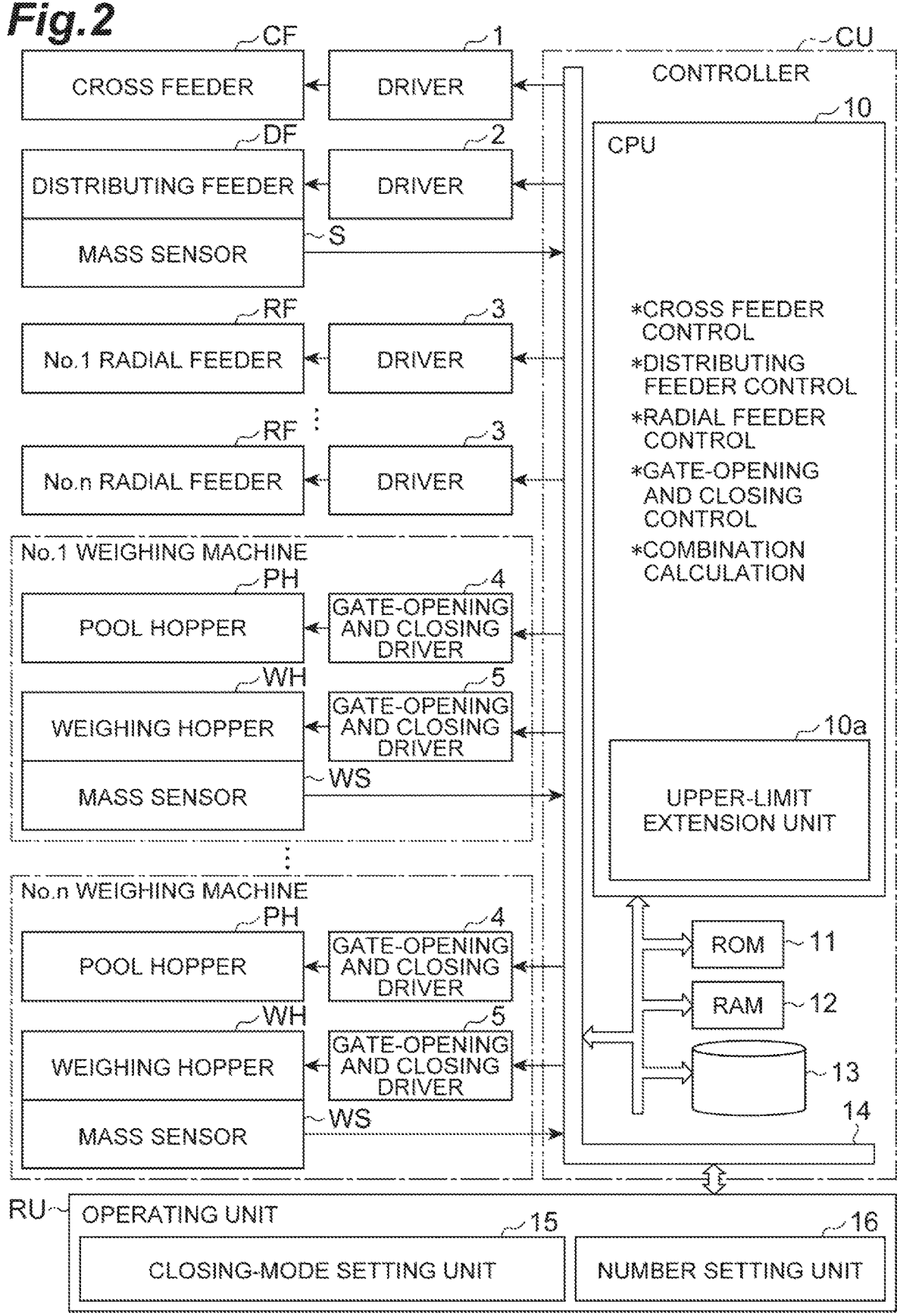
FIG. 2 is a functional block diagram of a principal portion in the one embodiment.

The controller CU is configured with a computer and, as illustrated in FIG. 2, includes a CPU 10, a ROM 11, a RAM 12, and a hard disk 13. These devices are mutually coupled via bus lines such as an address bus and a data bus. The controller CU is coupled, via an interface 14, to a driver 1 of the cross feeder CF, a driver 2 of the distributing feeder DF, drivers 3 of the radial feeders RF, gate-opening and closing drivers 4 of the pool hoppers PH, gate-opening and closing drivers 5 of the weighing hoppers WH, and an operating unit RU provided with a touch panel function. Moreover, from the mass sensor S that detects the loading amount on the distributing feeder DF and the mass sensor WS that detects the mass of the articles G supplied to the weighing hopper WH, measured values that have been converted into digital quantities are input to the controller CU, and the controller CU obtains the mass of the articles G by subtracting the tare mass from the measured values. In the case of number combinations, the number of pieces is obtained by dividing the obtained mass of the articles G by a unit mass and, based on the number of pieces, the combination calculation is executed.

In the ROM 11, various programs are stored. As the CPU 10 reads out and executes the respective various programs, performed are control for the cross feeder CF, control for the distributing feeder DF, control for the radial feeders RF, and the gate-opening and closing control of the pool hoppers PH and the weighing hoppers WH, and in addition, the combination calculation is also executed.

The CPU 10 executes, by executing a combination calculation program, a known combination calculation. That is, by combining the measured values input from the mass sensor WS of each weighing hopper WH, selected is an optimal combination for which a combined total value is the closest to a combination target value and that total value falls within a tolerable range. The CPU 10 transmits a discharge command to the weighing hoppers WH thus selected, that is, to the associated gate-opening and closing drivers 5. Accordingly, the gate-opening and closing driver 5 opens and closes the gate g in a certain opening and closing mode.

When an optimal combination is not found by the combination calculation, that is, when a miss-cycle which will be described later is repeated, the combination calculation is executed with the measured values of the respective forcibly discharged articles G and the new measured values measured at the subsequent cycle (the measured values of the articles G newly supplied due to forced discharge and the measured values of the articles G that were not forcibly discharged). The controller CU includes an upper-limit extension unit 10a that extends an upper limit of the above-described tolerable range so as to facilitate finding the optimal combination. The upper-limit extension unit 10a is stored in the ROM 11 as a program and, in the combination calculation after forced discharge, the program is read out and executed.

Furthermore, the CPU 10 transmits, after a certain time from releasing the weighing hopper WH, a discharge command to the gate-opening and closing driver 4 of the pool hopper PH at the upper stage. Then, because the gate g of the pool hopper PH opens at a timing of slightly before closing the gate g of the weighing hopper WH, the articles G discharged from the pool hopper PH reach that gate g at the timing at which the gate g of the weighing hopper WH closes.

Subsequently, the CPU 10 transmits, at a timing of slightly before closing the gate g of the pool hopper PH, a drive command to the driver 3 of the corresponding radial feeder RF and the gate-opening and closing driver 4 of the pool hopper PH. Then, because the radial feeder RF is driven from slightly before closing the gate g of the pool hopper PH, the articles G discharged from the radial feeder RF reach the gate g at a timing at which the gate g of the pool hopper PH closes.

As just described, following the weighing hopper WH at the lower stage, the pool hopper PH at the upper stage is opened and closed, and subsequently, the radial feeder RF and the distributing feeder DF are driven. In the drive control for the radial feeder RF, the vibration intensity and vibration time are adjusted so that the discharge amount discharged from an individual radial feeder RF becomes an ideal discharge weight each time. The ideal discharge weight is a value obtained by dividing the combination target value by the ideal number of combination selection hoppers. The ideal number of combination selection hoppers is, although possible to set from the operating unit RU, stored in the hard disk 13 as a default (initial setting) depending on a model.

The vibration intensity and vibration time of the radial feeder RF can be individually adjusted by specifying an individual radial feeder RF from the operating unit RU, or can be adjusted all together by specifying all the radial feeders RF. The adjustment of the vibration intensity and vibration time of the radial feeder RF can be performed either manually or automatically.

Meanwhile, in the drive control for the distributing feeder DF, the vibration intensity and vibration time of the distributing feeder DF are adjusted so that the discharge amount of the articles G that is discharged each time from the radial feeders RF, that is, the articles G equivalent to a combination target value, is discharged to the radial feeders RF from the distributing feeder DF each time. In addition, the loading amount on the distributing feeder DF is also adjusted.

The operating unit RU includes a touch panel function, and in its operating screen, a closing-mode setting unit 15 that sets a closing mode is provided. The closing-mode setting unit 15 is a setting key, specifically. In the operating screen in which an operating condition is set, a number setting unit 16 that sets an extension upper limit to extend the upper limit of the above-described tolerable range and that sets the number of times of continuation of failure in combination, that is the number of miss-cycles, is provided. The number setting unit 16, specifically, includes display fields of the extension upper limit and the number of miss-cycles, and numerical keys to input numerical values in the display fields.

The closing mode is a mode in which the articles G remaining in the device are discharged while repeating combination weighing cycles to the end, and the closing mode is set in a state that the supply of the articles G from the upstream is interrupted. Accordingly, the closing mode is entered in a state that there are almost no articles G, on the cross feeder CF, or that the articles G run out immediately even if there are some. When the distributing feeder DF and the radial feeders RF are automatically controlled in this state, because the control amount (for example, an amplitude value) abnormally rises, by storing the control amount of a normal mode immediately before setting the closing mode, the distributing feeder DF and the respective radial feeders RF are driven and controlled by that control amount.

Figure 3:
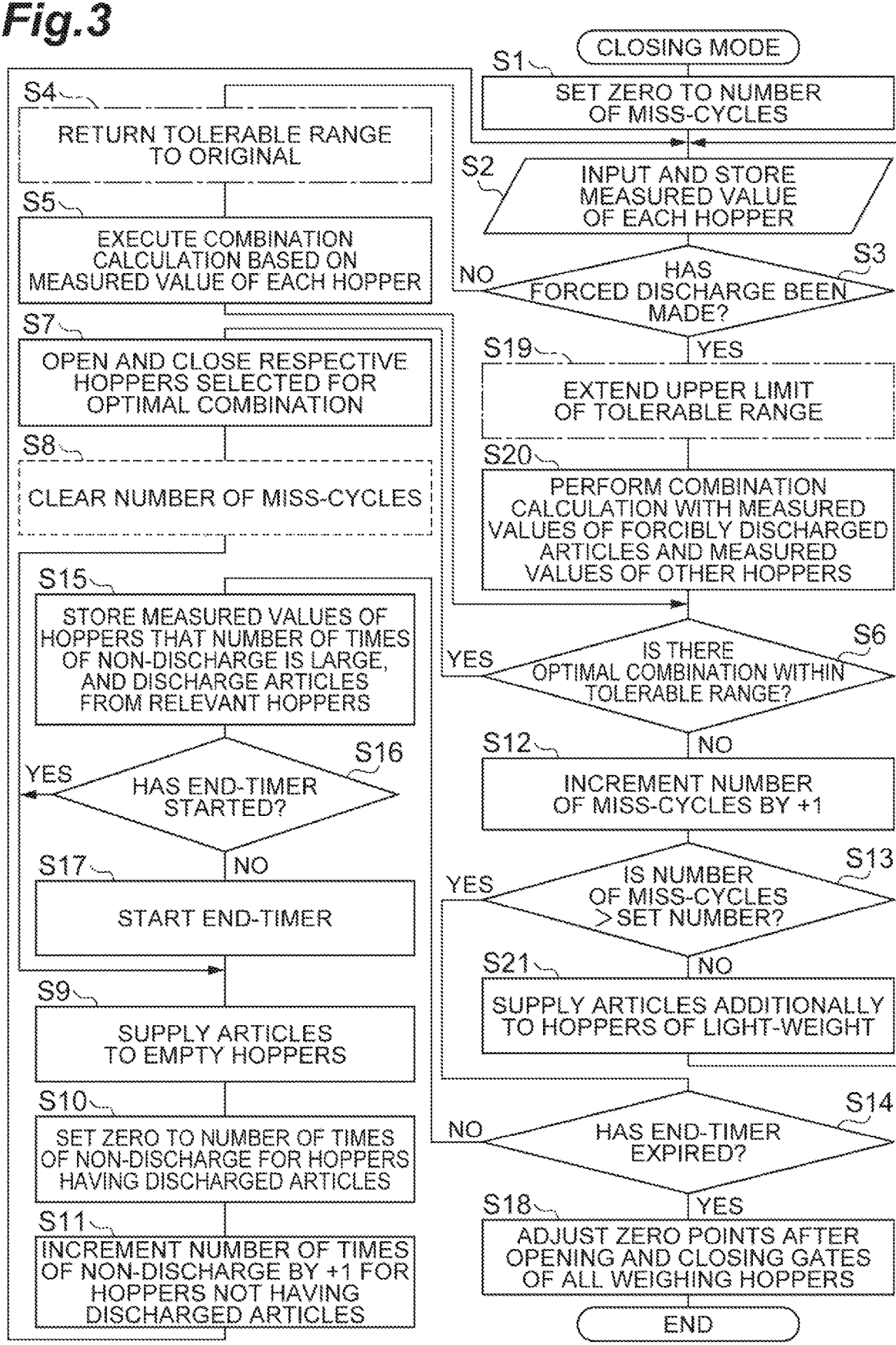
FIG. 3 is a flowchart illustrating the operation performed at the time of a closing mode in the one embodiment.

Next, the operation of the combination weighing apparatus 100 (combination weighing method) in entering this closing mode will be described with reference to the flowchart in FIG. 3. When the article G on a production line is switched to another type or when the production line is stopped after finishing the day's work, the operation is stopped in sequence from the devices of the upstream side, and by the combination weighing apparatus of the downstream side and the packaging device arranged at its lower stage, the articles G remaining on the line are made into bagged products and discharged. Then, when the supply of the articles G to the combination weighing apparatus 100 is interrupted by stopping in sequence the operation of the devices on the upstream side, an operator operates the closing-mode setting unit 15 and switches it to the closing mode. Consequently, the computer as the controller CU moves to the processing of the closing mode in FIG. 3 from the normal mode.

Upon entering the closing mode, the controller CU first sets zero to the number of miss-cycles (Step S1), and then inputs and stores the measured value of each weighing hopper WH (Step S2). Then, the controller CU checks whether forced discharge from the weighing hopper WH has been made (Step S3). Because forced discharge has not been performed first (No at S3), Step S4 is skipped, and the controller CU executes a combination calculation based on the measured value of each weighing hopper WH (Step S5).

As a result of the calculation (Step S6), if an optimal combination is found (Yes at S6), the controller CU opens and closes the gates g of the weighing hoppers WH of that set and discharges the articles G in the weighing hoppers WH to the collection chute CS (Step S7). The discharged articles G are put in the packaging device at the lower stage and are packed in a bag.

Subsequently, after clearing out the number of miss-cycles (Step S8), the controller CU supplies the articles G to the weighing hoppers WH that have discharged the articles G from the corresponding pool hoppers PH (Step S9). Because the number of miss-cycles in this case is the number of consecutive combination failures, when the combination is established, this number of miss-cycles is cleared out. Alternatively, because this state is a state in which almost no remaining amount of the articles G is present in the combination weighing apparatus 100, it is also possible to omit this Step S8. When the articles G are supplied to the weighing hopper WH from the pool hopper PH as the gate of the pool hopper PH is opened and closed, the radial feeder RF at the upper stage is driven and the articles G are supplied to the pool hopper PH that has been emptied.

Then, the controller CU sets zero to the number of times of non-discharge of the weighing hopper WH that discharged the articles G (Step S10), and after incrementing the number of times of non-discharge of the weighing hopper WH that did not discharge (Step S11), returns to the original Step S2. The number of times of non-discharge is the count of the number of times of the weighing hopper WH that, by defining the discharging of the articles G from the weighing hopper WH and the supplying of the articles G thereafter as one time, did not perform that. Thus, in the series of the weighing hoppers WH for which the number of times of non-discharge is large, a large amount of the articles G may be remaining, and that is expressed as the number of times of non-discharge.

In this way, the process returns to Step S2 again and the above-described processing is repeated. However, while the optimal combination is found at Step S6, the articles G weighed to a certain amount are discharged to the packaging device each time. Then, at Step S6 after several times, when the optimal combination is not found (No at S6), after incrementing the number of miss-cycles (Step S12), it is checked whether the number of miss-cycles exceeds a set number (Step S13). The set number is a value such as "2 to 4", for example. However, it is a value that is set appropriately depending on the type of the article G, the combination target value, and others, and is a mere example.

Then, if the number of miss-cycles does not exceed the set number (No at S13), out of the weighing hoppers WH, the articles G are additionally supplied to the weighing hopper WH for which the supplied articles G are less (for example, the weighing hopper WH to which no articles G were supplied even when the gate g of the pool hopper PH was opened and closed, or the weighing hopper WH to which only a small amount of the articles G was supplied) (Step S21).

When that is finished, the process returns to Step S2 again, and the controller CU executes the processing from Step S4 to Step S6. By that processing, if the optimal combination is found again, the process proceeds to the processing at Step S7 and subsequent steps. If the optimal combination is not found, after incrementing the number of miss-cycles again, the controller CU checks whether the number of miss-cycles exceeds the set number (Step S13). If the number of miss-cycles exceeds the set number (Yes at S13), it is checked whether an end-timer has expired (Step S14). If the end-timer has not expired (No at S14), after storing the measured values of the weighing hoppers WH for which the number of times of non-discharge is large, the controller CU forcibly discharges the articles G from the relevant weighing hoppers WH (Step S15).

Subsequently, it is checked whether the end-timer has started (Step S16). When the miss-cycle has been repeated more than the set number and the miss-cycle still continues, it can be determined that the articles G are no longer present except for the weighing hoppers WH. The end-timer measures the elapse of time during that time. Because this timer is not started first (No at S16), after starting the end-timer (Step S17), the articles G are supplied to the weighing hoppers WH that have become empty due to forced discharge (Step S9).

Meanwhile, when the articles G are forcibly discharged from some of the weighing hoppers WH by the controller CU at Step S15 and when the process moves to the processing at Step S9 by skipping Step S17 (Yes at S16), the articles G are newly supplied to the weighing hoppers WH that have been forcibly discharged. Accordingly, at Step S3 after returning to Step S2, it is determined by the controller CU that forced discharge from the weighing hopper WH has been made (Yes at S3). The controller CU extends the upper limit of the tolerable range for obtaining the optimal combination (Step S19). Then, the controller CU executes, by executing the combination calculation program in the extended tolerable range, a known combination calculation (Step S20). That is, by combining the measured values input from the mass sensor WS of each weighing hopper WH, selected is an optimal combination for which the combined total value is the closest to the combination target value and the total value falls within the extended tolerable range. As a result, if the optimal combination is found, the process moves from Step S6 to Step S7, and if not found, the process moves from Step S6 to the processing of Step S12.

While repeating such processing, the combination weighing reaches a dead end in a state that only a small amount of the articles G remained in some weighing hoppers WH. Thus, all the weighing hoppers WH are put into an empty state, by discharging those articles G after the end-timer expires, and the process is ended (Step S18). That is, if the miss cycles have been successively repeated a plurality of times and the end-timer has expired at Step S14, the process moves to Step S18 and, after discharging the articles G remaining in the weighing hoppers WH, zero points of all the weighing hoppers WH are input, and are updated and stored. This ends the closing mode.

When the optimal combination is not found and forcibly discharging preferentially from the weighing hopper WH for which the number of times of non-discharge is large is repeated, the amount of discharge by then may come close to a lower limit of the tolerable range, and at the next miss-cycle, even when the articles G are forcibly discharged from the weighing hopper WH for which the amount of articles G is least stored, the total value of the discharged amount may exceed the upper limit of the extended tolerable range. In such a case, the controller CU transmits a defect-discharging signal to the packaging device, without forcibly discharging the articles G from the weighing hopper WH, and makes the packaging device seal a bag in a light-weight state as compared with a prescribed value. That bag is removed from a shipping line, as a light-weight product, by a weight checker disposed on the downstream side of the packaging device.

Furthermore, even if such a situation does not occur, when a miss-cycle occurs again as the articles G of only a small amount are supplied to the weighing hopper WH that has been forcibly discharged and remains empty or no articles G are supplied, and when the miss-cycle is repeated in such a state until the end time of the timer, even if the articles G remaining in all the weighing hoppers WH are added up, the remaining amount is below the tolerable range. The controller CU, after releasing the gates of all the weighing hoppers WH and discharging, updates and stores the zero point of each weighing hopper WH and ends the process (Step S18), and then stops the operation of the combination weighing apparatus 100 and enters a stand-by state.

In the combination weighing apparatus 100 of the present embodiment, when the combination weighing is not established, the combination weighing is executed again, after additionally supplying the articles G to some of the weighing hoppers WH, not by forcibly discharging the articles G from some of the weighing hoppers WH suddenly. In that case, the combination weighing may be established. Thus, in the present embodiment, the case in which the combination weighing was not established includes a case in which the combination weighing was not established even when the articles G are additionally supplied to some of the weighing hoppers WH. Accordingly, in the present embodiment, even when entered the closing mode, it is possible to reduce the amount of the articles G remaining in the combination weighing apparatus 100 while discharging the articles G as the articles G weighed to a certain amount.

In the normal mode, repeated is a cycle of supplying the articles G to the weighing hoppers WH, of executing the combination weighing by combining the respective measured values obtained by weighing that follows, and of discharging the articles G from the selected weighing hoppers WH. Even when entered the closing mode, the cycle of the normal mode may be repeated while the remaining amount of the articles G is large, and when the remaining amount of the articles G becomes small, a cycle of executing the combination weighing by the foregoing additional supply may be repeated. When the combination is no longer established even so, by forcibly discharging the articles G from some of the weighing hoppers WH, a state of combination weighing failure may be eliminated. In this case, the number of the forcibly discharging hoppers is kept limited so that the total value of the forcibly discharged articles G is less than or equal to the lower limit of the tolerable range, or preferably below the lower limit. Subsequently, by supplying the articles G to the weighing hoppers WH that have been discharged and empty and weighing them, the next combination weighing is executed based on the respective obtained measured values (measured values of the forcibly discharged weighing hoppers WH and of the weighing hoppers WH other than those) and the measured value corresponding to the forcibly discharged articles G In this case, the combination weighing may be executed in a state in which the measured value corresponding to the forcibly discharged articles G is added to the combination total value at all times, or in place of this, the combination weighing may be executed with a difference value that is obtained by subtracting the measured value corresponding to the forcibly discharged articles G from the original combination-target measurement value, as a new combination-target measurement value.

In the present embodiment, as the weighing hopper WH of forcibly discharging, the weighing hopper WH for which the number of times of not having discharged the articles G is large is preferentially selected. When the number of times of non-discharge of the articles G is large, in the pool hopper PH at the upper stage that supplies the articles G to the relevant weighing hopper WH, and the radial feeder RF at the further upper stage thereof, a large amount of the articles G may remain. In the present embodiment, because such a series is preferentially selected, the amount of articles G remaining in the combination weighing apparatus 100 is effectively reduced.

The forcibly discharged articles G are temporarily stored in a timing hopper disposed at an upper stage of the packaging device, or are directly discharged to the packaging device. When discharging to the packaging device, without transmitting a weighing completion signal to the packaging device from the combination weighing apparatus 100, the packaging device is kept waiting. In that case, the articles G forcibly discharged into a bag remain stored in the bag without being sealed. Then, at the subsequent cycle, the combination weighing is executed based on the measured value corresponding to the forcibly discharged articles G and the respective measured values corresponding to the articles G subsequently weighed. As a result, if the combination weighing is established, the articles G are discharged from the weighing hoppers WH associated with the selected combination. The discharged articles G are stored in the timing hopper, or directly discharged to the bag that is filled with the forcibly discharged articles G, and are made into the articles G closest to the target measurement value. Then, the articles G are discharged to the packaging device from the timing hopper and are packaged. Alternatively, the bag that reached the certain amount is sealed to complete a bagged product.

When the remaining amount of the articles G in the combination weighing apparatus 100 thus becomes small, the articles G are not always supplied to the forcibly discharged weighing hoppers WH at the next cycle also. However, as long as the articles G are supplied to any of the weighing hoppers WH, the combination weighing may be newly established. However, if the combination weighing is still not established, the weighing hoppers WH for which the number of times of non-discharge is large are forcibly discharged again.

Because such forced discharge is executed when the combination weighing is not established, if the upper limit of the tolerable range is extended to facilitate establishing the combination weighing, the amount of the articles G remaining in the combination weighing apparatus 100 can be further reduced. In the present embodiment, after forcibly discharging the articles G from the weighing hoppers WH, the combination weighing is executed based on the measured values associated with the weighing hoppers WH and the measured value corresponding to the forcibly discharged articles G, after extending the upper limit of the tolerable range. Accordingly, it is possible to reduce the amount of the articles G remaining in the combination weighing apparatus 100 while discharging the articles G as the articles G of a certain amount.

When such processing is repeated, at the end, it falls into a state of being below the tolerable range even when the remaining amount of each weighing hopper WH is added up, and it is not possible to execute the combination weighing any further. In the present embodiment, at that time point, the articles G remaining in the weighing hoppers WH are discharged outside the combination weighing apparatus 100. Accordingly, the amount of the articles G remaining in the combination weighing apparatus 100 can be reduced to a minimum amount that cannot be made into a bagged product.

As in the foregoing, one embodiment has been explained. However, one aspect of the invention is not limited thereto, and other embodiments can be employed. For example, it can be similarly applied to a case that includes a booster hopper that temporarily stores therein the weighed articles G at the lower stage of the weighing hopper WH and makes the measured value of the relevant articles G participate in the combination calculation. In the above-described embodiment, the articles G have been forcibly discharged from some of the weighing hoppers WH and the articles G have been supplied to the relevant weighing hoppers WH, and then the combination weighing has been performed based on the measured values weighed in the weighing hoppers WH and the measured value of the forcibly discharged articles G In place of this, the optimal combination may be obtained by using a difference value that is obtained by subtracting the measured value of the forcibly discharged articles G from the original combination target value, as a new combination-target measurement value.

In the combination weighing method according to one aspect of the present invention, in the closing mode in which the combination weighing is repeated while supplying the articles remaining in the device to a plurality of weighing hoppers in a state that the new supply of the articles is interrupted, when the combination is not established, the articles are forcibly discharged from at least some of the weighing hoppers and the articles are supplied to the weighing hoppers again, and then the articles of optimal combination are obtained based on the measured values of the weighing hoppers and the measured value of the forcibly discharged articles and are discharged.

The combination weighing apparatus according to one aspect of the present invention includes a plurality of weighing hoppers that weigh articles; a controller that obtains, based on the measured values of the articles weighed in the respective weighing hoppers, the optimal combination and discharges the articles from the weighing hoppers belonging to the obtained optimal combination; and a closing-mode setting unit that causes the combination weighing to be performed with the articles remaining in the device. When the closing mode is set by the setting unit, the controller obtains the articles of the optimal combination based on the measured value of the forcibly discharged articles from at least some of the weighing hoppers acquired in a cycle of combination failure and the measured values of the weighing hoppers weighed in the subsequent cycle.

REFERENCE SIGNS LIST

WH Weighing hopper (hopper)
CU Controller
15 Closing-mode setting unit (setting unit)
16 Number setting unit (setting unit)

The invention claimed is:
1. A combination weighing apparatus comprising:
a conveying unit configured to convey articles;
a plurality of hoppers configured to temporarily store therein the articles conveyed by the conveying unit;
a weighing unit configured to weigh a measured value corresponding to a mass of the articles stored in each of the hoppers;
a controller configured to execute a combination weighing that selects a combination of measured values from the plurality of measured values weighed by the weighing unit and associated with the respective hoppers such that a total value of the measured values to be combined is within a predetermined range of a target measurement value, and that causes the hoppers associated with the combination to discharge the articles; and
a setting unit configured to set a closing mode in which the combination weighing is executed on the articles remaining in the conveying unit and the hoppers in a state that supply of the articles to the conveying unit is stopped, wherein when the closing mode is set by the setting unit, the controller is configured to execute the combination weighing based on a measured value acquired in a cycle in which the combination weighing failed such that the total value was not within the predetermined range of the target measurement value and corresponding to articles that were discharged from at least some of the hoppers when the combination weighing failed, and measured values associated with the respective hoppers weighed in a cycle after the cycle in which the combination weighing failed.

2. The combination weighing apparatus according to claim 1, wherein
the setting unit is configured to be capable of setting a number of times of continuation after the failed combination weighing in the closing mode,
the controller is configured to perform the combination weighing after additionally supplying the articles to some of the hoppers each time the combination weighing fails, while the number of times of continuation is below the number of times set by the setting unit, and
the controller is configured to execute the combination weighing based on measured values corresponding to the articles that were discharged from some of the hoppers and measured values associated with the respective hoppers weighed in a cycle after the cycle in which the combination weighing failed, when the number of times of continuation reaches the number of times of continuation set by the setting unit.

3. The combination weighing apparatus according to claim 1, further comprising:
an upper-limit extension unit configured to extend an upper limit of the target measurement values, wherein
the controller is configured to execute, after extending the upper limit of the target measurement value, the combination weighing based on measured values acquired in a cycle in which the combination weighing failed and corresponding to the articles that were discharged from at least some of the hoppers and measured values associated with the respective hoppers weighed in a cycle after the cycle in which the combination weighing failed.

4. The combination weighing apparatus according to claim 1, wherein the case in which the combination weighing failed includes a case in which combination weighing was not established even when the articles were additionally supplied to some of the hoppers.

5. A combination weighing method for executing combination weighing in which, when articles remaining in a combination weighing apparatus are supplied to a plurality of hoppers in a state that new supply of the articles is interrupted, a combination of measured values is selected from a plurality of measured values associated with the respective hoppers such that a total value of the measured values to be combined is within a predetermined range of a target measurement value, the combination weighing method comprising steps of:
discharging the articles from at least some of the hoppers and supplying the articles again to the hoppers which discharged the articles, when the combination weighing fails such that the total value was not within the predetermined range of the target measurement value; and
executing the combination weighing based on measured values acquired in a cycle in which the combination weighing failed and corresponding to the articles that were forcibly discharged from at least some of the hoppers when the combination weighing failed, and measured values associated with the respective hoppers weighed in a cycle after the cycle in which the combination weighing failed.

6. The combination weighing method according to claim 5, wherein the case in which the combination weighing failed includes a case in which combination weighing was not established even when the articles were additionally supplied to some of the hoppers.

7. The combination weighing method according to claim 5, wherein, after discharging the articles from some of the hoppers, the combination weighing is executed based on, after extending an upper limit of the target measurement values, measured values acquired in a cycle in which the combination weighing failed and corresponding to the articles that were discharged from at least some of the hoppers and measured values associated with the respective hoppers weighed in a cycle after the cycle in which the combination weighing failed.

8. The combination weighing apparatus according to claim 2, further comprising:
an upper-limit extension unit configured to extend an upper limit of the target measurement values, wherein
the controller is configured to execute, after extending the upper limit of the target measurement value, the combination weighing based on measured values acquired in a cycle in which the combination weighing failed and corresponding to the articles that were discharged from at least some of the hoppers and measured values associated with the respective hoppers weighed in a cycle after the cycle in which the combination weighing failed.

9. The combination weighing apparatus according to claim 2, wherein the case in which the combination weighing failed includes a case in which combination weighing was not established even when the articles were additionally supplied to some of the hoppers.

10. The combination weighing apparatus according to claim 3, wherein the case in which the combination weighing failed includes a case in which combination weighing was not established even when the articles were additionally supplied to some of the hoppers.

11. The combination weighing apparatus according to claim 8, wherein the case in which the combination weighing failed includes a case in which combination weighing was not established even when the articles were additionally supplied to some of the hoppers.

12. The combination weighing method according to claim 6, wherein, after discharging the articles from some of the hoppers, the combination weighing is executed based on, after extending an upper limit of the target measurement values, measured values acquired in a cycle in which the combination weighing failed and corresponding to the articles that were discharged from at least some of the hoppers and measured values associated with the respective hoppers weighed in a cycle after the cycle in which the combination weighing failed.

* * * * *